(12) United States Patent
Zeng

(10) Patent No.: US 11,610,287 B2
(45) Date of Patent: Mar. 21, 2023

(54) MOTION TRAIL UPDATE METHOD, HEAD-MOUNTED DISPLAY DEVICE AND COMPUTER-READABLE MEDIUM

(71) Applicant: HANGZHOU LINGBAN TECHNOLOGY CO. LTD., Hangzhou (CN)

(72) Inventor: Tao Zeng, Hangzhou (CN)

(73) Assignee: HANGZHOU LINBAN TECHNOLOGY CO. LTD., Hangzhou (CN)

( * ) Notice: Subject to any disclaimer, the term of this patent is extended or adjusted under 35 U.S.C. 154(b) by 0 days.

(21) Appl. No.: 17/750,866

(22) Filed: May 23, 2022

(65) Prior Publication Data
US 2022/0383457 A1    Dec. 1, 2022

(30) Foreign Application Priority Data
May 27, 2021    (CN) .......................... 202110581826.1

(51) Int. Cl.
| | |
|---|---|
| *G06T 5/00* | (2006.01) |
| *G06T 11/00* | (2006.01) |
| *G06F 3/01* | (2006.01) |

(52) U.S. Cl.
CPC .............. *G06T 5/002* (2013.01); *G06F 3/012* (2013.01); *G06T 11/00* (2013.01)

(58) Field of Classification Search
CPC .......... G06T 5/002; G06T 11/00; G06F 3/012
See application file for complete search history.

(56) References Cited

U.S. PATENT DOCUMENTS

| | | | |
|---|---|---|---|
| 2018/0108179 A1* | 4/2018 | Tomlin .................. | G06F 3/0346 |
| 2019/0318501 A1* | 10/2019 | Balan .................... | A63F 13/212 |

(Continued)

FOREIGN PATENT DOCUMENTS

| | | |
|---|---|---|
| CN | 106066688 A | 11/2016 |
| CN | 109739356 A | 5/2019 |

(Continued)

OTHER PUBLICATIONS

CN 202110581826.1—First Search, dated Jun. 28, 2021, 1 page.
(Continued)

*Primary Examiner* — Temesghen Ghebretinsae
*Assistant Examiner* — Ivelisse Martinez Quiles
(74) *Attorney, Agent, or Firm* — Getech Law LLC; Jun Ye

(57) ABSTRACT

A motion trail update method includes: receiving first pose information for a target device transmitted by a first sensor at a first frequency; selecting second pose information meeting a preset condition from a second pose information queue as target second pose information to obtain a target second pose information set; performing trail smoothing on adjacent pose information and the first pose information by using the target second pose information set to obtain a smooth pose information sequence; performing mapping on each piece of smooth pose information in the smooth pose information sequence to obtain a target pose information sequence of a virtual object, corresponding to the target device, in a virtual space; and updating a motion trail of the virtual object in the virtual space. In the embodiment, according to the first pose information and the second pose information, positioning precision and motion trail update precision are improved, and interaction experience of the head-mounted display device is optimized.

9 Claims, 6 Drawing Sheets

(56) References Cited

U.S. PATENT DOCUMENTS

2021/0063735 A1    3/2021   Cai et al.
2021/0356743 A1*  11/2021   Muldoon .............. G06F 3/0488

FOREIGN PATENT DOCUMENTS

CN    112578671 A    3/2021
CN    113031783 B    8/2021

OTHER PUBLICATIONS

CN 202110581826.1—Supplemental Search, dated Jul. 12, 2021, 1 page.
CN 202110581826.1—First Office Action, dated Jul. 2, 2021, 8 pages. (with English translation).
CN 202110581826.1—Notification to Grant, dated Jul. 14, 2021, 2 pages.

* cited by examiner

MOTION TRAIL UPDATE METHOD, HEAD-MOUNTED DISPLAY DEVICE AND COMPUTER-READABLE MEDIUM

TECHNICAL FIELD

Embodiments of the present disclosure relate to the technical field of computers, and in particular relate to a motion trail update method, a head-mounted display device and a computer-readable medium.

BACKGROUND

Head-mounted display devices, such as augmented reality (AR) glasses or mixed reality (MR) glasses, allow users to view a virtual object in a virtual space. At present, when updating a motion trail of a virtual object displayed on a display screen of the head-mounted display device, a usual method is: to determine a position and a motion trail of the virtual object by using a device having a 3 degrees of freedom (3 DOF) acquisition function or a 6 degrees of freedom (6 DOF) acquisition function.

However, when updating the motion trail of the virtual object in the above-mentioned manner, there are often technical problems as follows:

The device with the 3 DOF acquisition function cannot acquire spatial absolute coordinate information, is low in positioning precision, is difficult to fuse with a display scene, and cannot be used in an AR scene, and the device with the 6 DOF acquisition function is high in power consumption, is easily interfered by environmental factors, and cannot be applied to portable head-mounted display devices.

SUMMARY

Summary of the present disclosure is provided to introduce concepts in a simplified form that will be described in detail below in Detailed Description. Summary of the present disclosure is not intended to identify key features or essential features of the claimed technical solutions, and is not intended to be used to limit the scopes of the claimed technical solutions either.

Some embodiments of the present disclosure disclose a motion trail update method, a head-mounted display device and a computer-readable medium, to solve the technical problems mentioned in Background above.

In a first aspect, some embodiments of the present disclosure provide a motion trail update method, applied to a head-mounted display device having a display screen. The method includes: receiving first pose information for a target device transmitted by a first sensor at a first frequency, where the first sensor is disposed in the head-mounted display device; in response to determining that adjacent pose information exists and that the first pose information and second pose information at the tail of a second pose information queue meet a separation inspection condition, selecting second pose information meeting a preset condition from the second pose information queue as target second pose information to obtain a target second pose information set, where the adjacent pose information is first pose information which is previously received and is adjacent to the first pose information; performing trail smoothing on the adjacent pose information and the first pose information by using the target second pose information set to obtain a smooth pose information sequence, and updating the second pose information queue according to the smooth pose information sequence; performing mapping on each piece of smooth pose information in the smooth pose information sequence to obtain a target pose information sequence of a virtual object, corresponding to the target device, in a virtual space, where the virtual space is displayed in the display screen of the head-mounted display device; and updating a motion trail of the virtual object in the virtual space based on the target pose information sequence.

In a second aspect, some embodiments of the present disclosure provide a head-mounted display device, comprising one or more processors, a storage apparatus on which one or more programs are stored; a display screen, configured to display a virtual space; and a first sensor, configured to transmit first pose information for a target device at a first frequency, where the one or more programs, when executed by the one or more processors, cause the one or more processors to implement the method described by any implementation of the above-mentioned first aspect.

In a third aspect, some embodiments of the present disclosure provide a computer-readable medium on which a computer program is stored, where the program, when executed by a processor, implements the method described by any implementation of the above-mentioned first aspect.

The above-mentioned embodiments of the present disclosure have the following beneficial effects: Through the motion trail update method according to some embodiments of the present disclosure, under the premise of not increasing power consumption of the device, positioning precision and motion trail update precision are improved, and interaction experience of the head-mounted display device is optimized. Specifically, reasons for low related positioning precision and motion trail update precision are that a device with a 3 DOF acquisition function cannot acquire spatial absolute coordinate information, is low in positioning precision, is difficult to fuse with a display scene, and cannot be used in an AR scene, and a device with a 6 DOF acquisition function is high in power consumption, is easily interfered by environmental factors, and cannot be applied to portable head-mounted display devices. Based on this, in the motion trail update method according to some embodiments of the present disclosure, firstly, the first pose information for the target device transmitted by the first sensor at the first frequency is received, where the first sensor is a sensor with low power consumption disposed in the head-mounted display device. The first pose information transmitted by the first sensor may include spatial absolute coordinate information. Thus, fusion of the target device and a real scene can be realized by using the first pose information, which facilitates displaying of the virtual object, corresponding to the target device, in the AR scene. Then, in response to determining that the adjacent pose information exists and that the first pose information and the second pose information at the tail of the second pose information queue meet the separation inspection condition, the second pose information meeting the preset condition is selected from the second pose information queue as the target second pose information to obtain the target second pose information set, where the adjacent pose information is first pose information which is previously received and is adjacent to the first pose information. Thus, the second pose information between the first pose information that is continuously received twice can be determined as the target second pose information, which facilitates subsequent use of the second pose information in the second pose information set to perform trail smoothing on the first pose information. Then, trail smoothing is performed on the adjacent pose information and the first pose information by using the target second pose information set to obtain the smooth pose information sequence, and the second pose information queue is updated according to the smooth pose information sequence. Thus, the first pose information and the target second pose information can be combined to obtain a relatively accurate positioning result and a relatively accurate trail update result. Then, mapping is performed on each piece of smooth pose information in the smooth pose information sequence to obtain the target pose information sequence of the virtual object, corresponding to the target device, in the virtual space, where the virtual space is displayed in the display screen of the head-mounted display device. Thus, the position and pose of the virtual object, corresponding to the target device, in the virtual space can be determined. Finally, the motion trail of the virtual object is updated in the virtual space based on the target pose information sequence. Therefore, under the premise of not increasing power consumption of the device, according to the first pose information and the second pose information, the positioning precision and the motion trail update precision are improved, and the interaction experience of the head-mounted display device is optimized.

BRIEF DESCRIPTION OF DRAWINGS

The above and other features, advantages and aspects of various embodiments of the present disclosure will become more apparent in conjunction with the accompanying drawings and with reference to the following detailed description. Throughout the drawings, the same or similar reference numbers refer to the same or similar elements. It should be understood that the drawings are illustrative and that components and elements are not necessarily drawn to scale.

DESCRIPTION OF EMBODIMENTS

Figure 1:
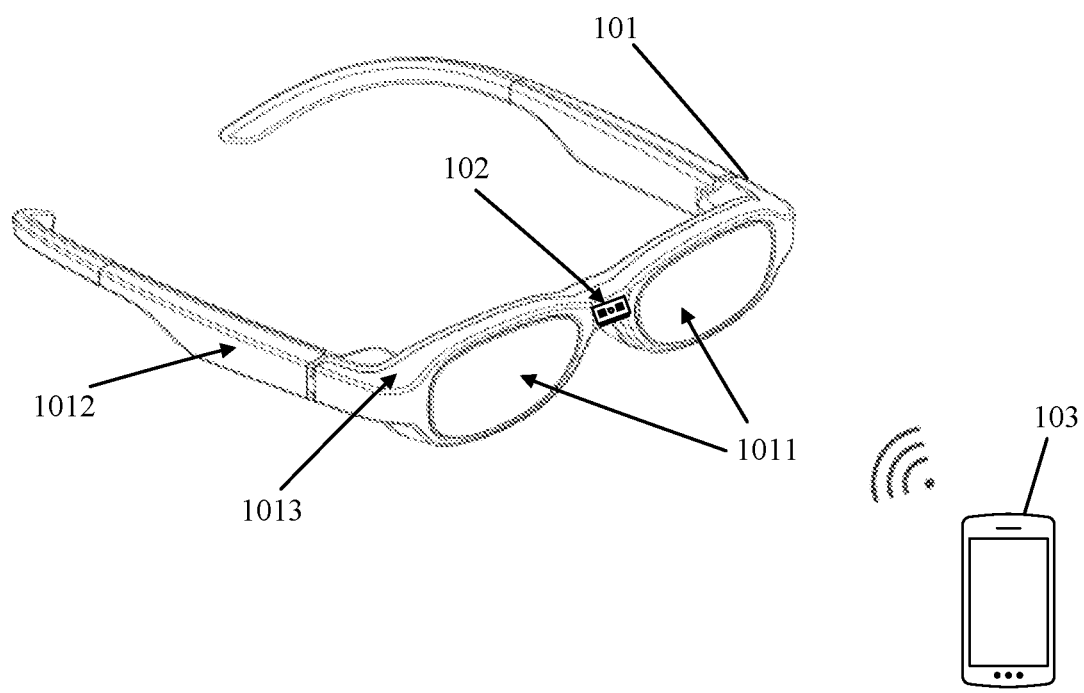
FIG. 1 is an architectural diagram of an exemplary system in which some embodiments of the present disclosure can be applied.

Embodiments of the present disclosure will be described in more detail below with reference to the accompanying drawings. Although some embodiments of the present disclosure are shown in the drawings, it should be understood that the present disclosure can be embodied in various forms and should not be construed as limited to the embodiments set forth herein. Rather, these embodiments are provided for a more thorough and complete understanding of the present disclosure. It should be understood that the drawings and embodiments of the present disclosure are for exemplary purposes only and are not intended to limit the scope of protection of the present disclosure.

It should also be noted that, for ease of description, only parts relevant to the relevant invention are shown in the drawings. Embodiments and features in the embodiments of the present disclosure can be combined with each other in case of no conflict.

It should be noted that the concepts of "first", "second", and the like mentioned in the present disclosure are only used to distinguish between different apparatuses, modules or units, and are not used to limit the order or interdependence of functions performed by these apparatuses, modules or units.

It should be noted that the expression of "one" or "a plurality" mentioned in the present disclosure is illustrative rather than restrictive, and those skilled in the art should understand that unless otherwise clearly specified in the context, it should be understood as "one or more".

The names of messages or information exchanged between a plurality of apparatuses in embodiments of the present disclosure are for illustrative purposes only and are not intended to limit the scope of such messages or information.

The present disclosure will now be described in detail with reference to the drawings and in conjunction with embodiments.

FIG. 1 is an architectural diagram of an exemplary system in which some embodiments of the present disclosure can be applied.

As shown in FIG. 1, the architecture of the exemplary system 100 may include a head-mounted display device 101, a first sensor 102 and a target device 103.

The head-mounted display device 101 may include at least one display screen 1011. The display screen 1011 may be used to display a virtual space. In addition, the head-mounted display device 101 further includes a spectacle bracket 1012 and a spectacle frame 1013. In some embodiments, a processing unit, a memory and a battery of the head-mounted display device 101 may be placed in the spectacle bracket 1012. In some optional implementations of some embodiments, one or more of the processing unit, the memory and the battery may be integrated into another independent accessory (not shown), and are connected to the spectacle bracket 1012 via a data line.

The first sensor 102 may be disposed in the head-mounted display device 101. In some embodiments, the head-mounted display device 101 and the first sensor 102 may communicate with each other in a wireless connection manner or a wired connection manner. The first sensor 102 may be disposed on the spectacle frame 1013 in the head-mounted display device 101.

The target device 103 may communicate with the head-mounted display device 101 or the first sensor 102 in a wireless connection manner or a wired connection manner.

It should be understood that the numbers of head-mounted display devices, first sensors and target devices in FIG. 1 are merely illustrative. There may be any number of head-mounted display devices, first sensors and target devices depending on implementation needs.

Figure 2:
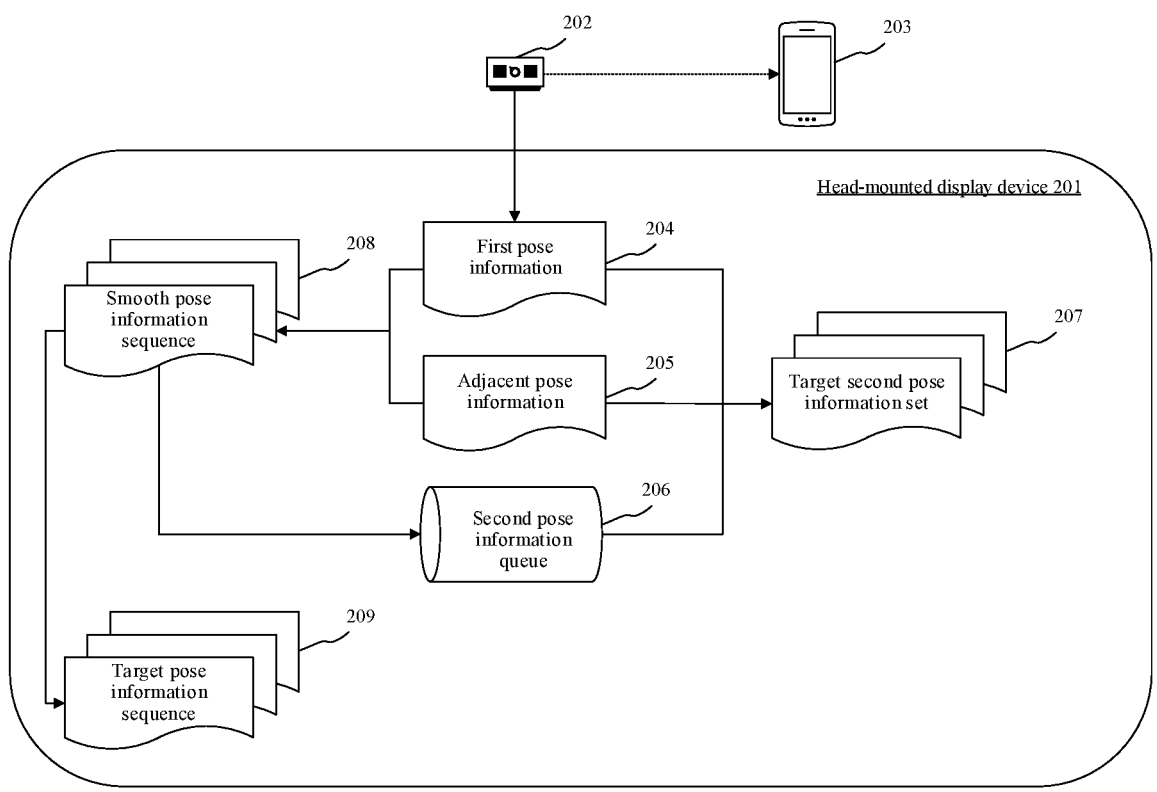
FIG. 2 is a schematic diagram of an application scene of a motion trail update method according to some embodiments of the present disclosure.

FIG. 2 is a schematic diagram of an application scene of a motion trail update method according to some embodiments of the present disclosure.

In the application scene of FIG. 2, firstly, a head-mounted display device 201 may receive first pose information 204 for a target device 203 transmitted by a first sensor 202 at a first frequency, where the first sensor 202 is disposed in the head-mounted display device 201. Then, in response to determining that adjacent pose information 205 exists and that the first pose information 204 and second pose information at the tail of a second pose information queue 206 meet a separation inspection condition, the head-mounted display device 201 may select second pose information meeting a preset condition from the second pose information queue 206 as target second pose information to obtain a target second pose information set 207, where the adjacent pose information 205 is first pose information which is previously received and is adjacent to the first pose information 204. Then, the head-mounted display device 201 may use the target second pose information set 207 to perform trail smoothing on the adjacent pose information 205 and the first pose information 204, so as to obtain a smooth pose information sequence 208, and update the second pose information queue 206 according to the smooth pose information sequence 208. Then, the head-mounted display device 201 may perform mapping on each piece of smooth pose information in the smooth pose information sequence 208 to obtain a target pose information sequence 209 of a virtual object, corresponding to the target device 203, in a virtual space, where the virtual space is displayed in a display screen of the head-mounted display device 201. Finally, the head-mounted display device 201 may update a motion trail of the virtual object in the virtual space based on the target pose information sequence 209.

Figure 3:
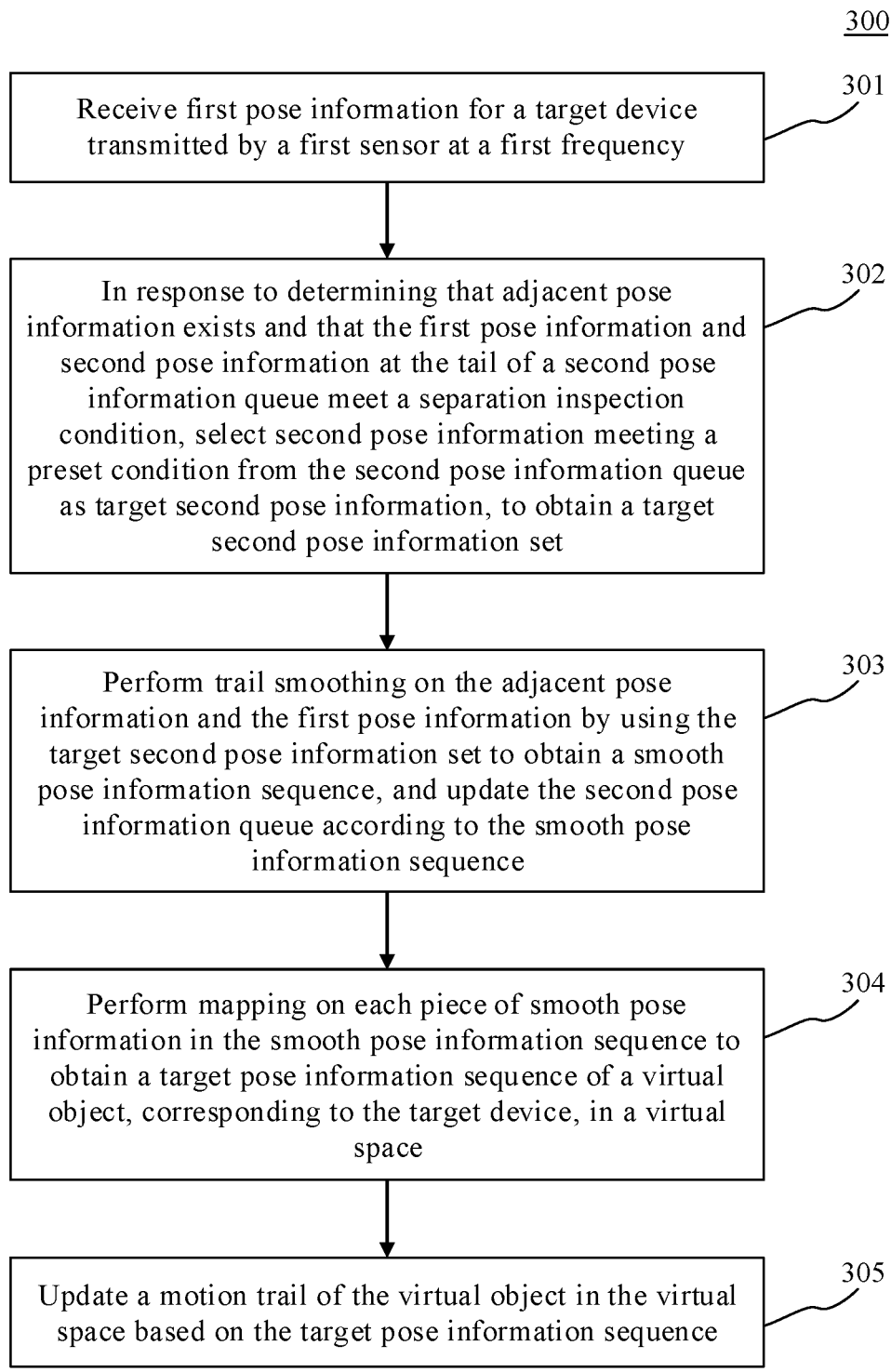
FIG. 3 is a flowchart of a motion trail update method according to some embodiments of the present disclosure.

Continuing to refer to FIG. 3, a flow 300 of a motion trail update method according to some embodiments of the present disclosure is shown, which may be applied to a head-mounted display device having a display screen. The flow 300 of the motion trail update method includes the following steps:

Step 301. Receive first pose information for a target device transmitted by a first sensor at a first frequency.

In some embodiments, an execution body (e.g., the head-mounted display device 201 shown in FIG. 2) of the motion trail update method may receive, in a wired connection manner or a wireless connection manner, the first pose information for the target device transmitted by the first sensor at the first frequency, where the first sensor may be disposed in the head-mounted display device. For example, the first sensor may be installed directly below the head-mounted display device, or may be installed on the spectacle frame of the head-mounted display device. The first sensor may be a sensor capable of determining spatial absolute coordinate information of the target device, for example, an indirect time-of-flight (ITOF) sensor, a direct time-of-flight (DTOF) sensor, or the like. The DTOF sensor directly measures time of flight and has the advantages of low power consumption, anti-interference, etc., and in the application scene of one or more embodiments of the present invention, only a distance between the target device and the head-mounted display device needs to be determined, which can be achieved without high resolution. Therefore, in one or more embodiments of the present invention, the DTOF sensor can preferably be used as the first sensor. To further reduce costs and device power consumption, the DTOF sensor having resolution not higher than 256 pixels, such as 8*8 or 8*16, may be selected as the first sensor. The target device may be a device with a control function connected to the head-mounted display device in a wired connection manner or a wireless connection manner, for example, a mobile phone, a handle, a bracelet, a ring, etc. The first frequency may be 60 Hz.

The first pose information may include a first rotation quaternion and first coordinates. The first coordinates may include three-dimensional coordinate values of an x-axis, a y-axis, and a z-axis. The three-dimensional coordinate values may be three-dimensional coordinate values of the target device in a fixed reference coordinate system. The fixed reference coordinate system may be a three-dimensional coordinate system established by taking the center of mass of the target device or the head-mounted display device as an origin, taking an axis which passes through the origin and is perpendicular to a horizontal plane as a z axis, taking an axis which passes through the origin, is parallel to the horizontal plane and is perpendicular to the z axis as an x axis, and taking an axis which passes through the origin and is simultaneously perpendicular to the z axis and the x axis as a y axis, when the target device is connected to the head-mounted display device. The first rotation quaternion may represent any rotation pose of the target device in a three-dimensional space.

Step 302. In response to determining that adjacent pose information exists and that the first pose information and second pose information at the tail of a second pose information queue meet a separation inspection condition, select second pose information meeting a preset condition from the second pose information queue as target second pose information to obtain a target second pose information set.

In some embodiments, in response to determining that the adjacent pose information exists and that the first pose information and the second pose information at the tail of the second pose information queue meet the separation inspection condition, the execution body may select the second pose information meeting the preset condition from the second pose information queue as the target second pose information to obtain the target second pose information set, where the adjacent pose information is first pose information which is previously received and is adjacent to the first pose information, that is, the last first pose information received before the first pose information is received. The second pose information at the tail of the second pose information queue is second pose information newly added into the second pose information queue. The second pose information in the second pose information queue may include a second rotation quaternion and second coordinates. The second coordinates may represent three-dimensional coordinates of the target device in the fixed reference coordinate system.

The preset condition may be that a receiving time of the second pose information is between a time point of receiving the adjacent pose information and a time point of receiving the first pose information. The separation inspection condition may be that a pose deviation between the first pose information and the second pose information is smaller than or equal to a preset degree and a displacement deviation therebetween is smaller than or equal to a preset displacement length. In practice, the preset degree and the preset displacement length may be adjusted according to actual applications, which are not limited here. The separation inspection condition may be used to determine a size of a data deviation between the first pose information and the second pose information. If the first pose information and the second pose information at the tail of the second pose information queue meet the separation inspection condition, it may indicate that a data deviation between the first pose information and the second pose information at the tail of the second pose information queue is small. The second pose information in the second pose information queue may be used to perform trail smoothing on the adjacent pose information and the first pose information. If the first pose information and the second pose information at the tail of the second pose information queue do not meet the separation inspection condition, it may indicate that the data deviation between the first pose information and the second pose information at the tail of the second pose information queue is large. In this case, if the second pose information in the second pose information queue is used to perform trail smoothing on the adjacent pose information and the first pose information, a deviation between a finally updated trail and an actual motion trail of the target device is large, which greatly lowers interaction experience.

The execution body may respectively perform calculation on the first rotation quaternion included in the first pose information and the second rotation quaternion included in the second pose information at the tail of the second pose information queue to obtain a first rotation angle and a second rotation angle. The absolute value of the difference between the first rotation angle and the second rotation angle may be used as a pose deviation. The distance between the first coordinates included in the first pose information and the second coordinates included in the second pose information at the tail of the second pose information queue may be used as a position deviation.

As an example, the preset degree may be 5 degrees. The preset displacement length may be 5 cm. The separation inspection condition may be that the pose deviation between the first pose information and the second pose information is smaller than or equal to 5 degrees and the displacement deviation therebetween is smaller than or equal to 5 cm.

In some optional implementations of some embodiments, the second pose information in the second pose information queue may be generated by the following steps:

Step 1: Receive relative pose information for the target device transmitted by a second sensor at a second frequency, where the second sensor may be disposed in the target device, and the second frequency may be higher than the first frequency. The second sensor may be a sensor capable of determining spatial relative position information of the target device, for example, an inertial measurement unit (IMU). The relative pose information may include a third rotation quaternion and relative displacements. The relative displacements may include displacements of the target device in the x-axis, the y-axis and the z-axis. Thus, relative position information with a higher frequency generated by the second sensor may be fused with absolute position information with a lower frequency generated by the first sensor, so as to obtain more accurate positioning information and trail information. As an example, the second frequency may be 1000 Hz.

Step 2: In response to determining that the adjacent pose information exists and that the second pose information queue is empty, generate the second pose information according to the adjacent pose information and the relative pose information. The third rotation quaternion included in the relative pose information may be determined as the second rotation quaternion in the second pose information. The three-dimensional coordinate values of the x-axis, y-axis and z-axis in the first coordinates included in the adjacent pose information are respectively added with the displacements of the x-axis, y-axis and z-axis in the relative displacements included in the relative pose information to obtain the second coordinates in the second pose information. Thus, the adjacent pose information representing the absolute pose information can be combined with the relative pose information to obtain new second pose information representing the absolute pose information.

Step 3: In response to determining that the adjacent pose information exists and that the second pose information queue is not empty, generate second pose information according to the second pose information at the tail of the second pose information queue and the relative pose information. The third rotation quaternion included in the relative pose information may be determined as the second rotation quaternion in the second pose information. The three-dimensional coordinate values of the x-axis, y-axis and z-axis in the second coordinates included in the second pose information at the tail of the second pose information queue are respectively added with the displacements of the x-axis, y-axis and z-axis in the relative displacements included in the relative pose information to obtain the second coordinates in the second pose information.

Step 4: Add the generated second pose information into the second pose information queue. The generated second pose information may be added into the tail of the second pose information queue. If the second pose information queue is full, second pose information at the head of the second pose information queue may be deleted at first, and then the generated second pose information is added into the tail of the second pose information queue.

Figure 4:
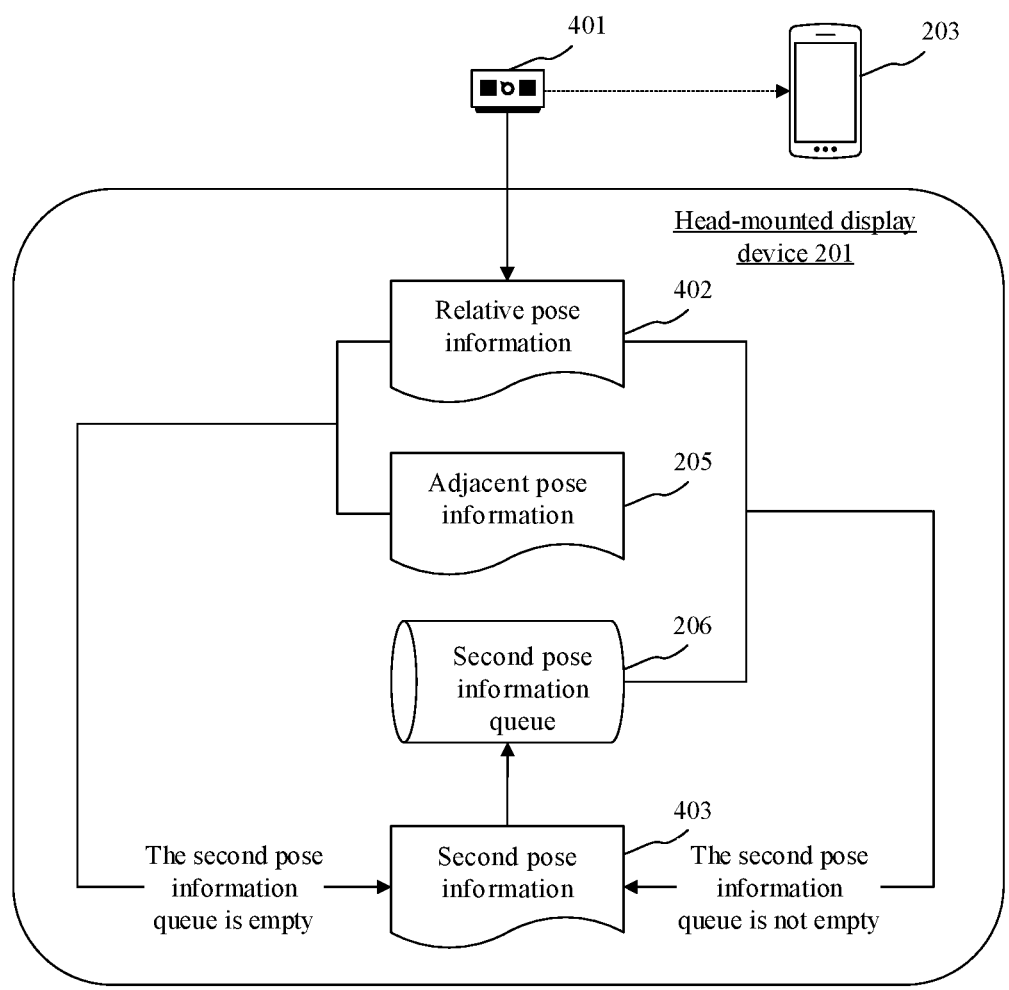
FIG. 4 is a schematic diagram of generating second pose information in a motion trail update method according to some embodiments of the present disclosure.

As an example, referring to FIG. 4, firstly, the head-mounted display device 201 may receive relative pose information 402 for the target device 203 transmitted by a second sensor 401 at a second frequency, where the second sensor 401 is disposed in the target device 203, and the second frequency is higher than the first frequency. Then, in response to determining that the adjacent pose information 205 exists and that the second pose information queue 206 is empty, the head-mounted display device 201 may generate second pose information 403 according to the adjacent pose information 205 and the relative pose information 402. Meanwhile, in response to determining that the adjacent pose information 205 exists and that the second pose information queue 206 is not empty, the head-mounted display device 201 may generate second pose information 403 according to the second pose information at the tail of the second pose information queue 206 and the relative pose information 402. Finally, the head-mounted display device 201 may add the generated second pose information 403 into the tail of the second pose information queue 206.

In some optional implementations of some embodiments, the execution body may further perform the following steps:

Step 1: In response to determining that the adjacent pose information does not exist, determine an initial display position of the virtual object in the virtual space according to the first pose information, where the first coordinates included in the first pose information may be mapped to a coordinate system of the virtual space to obtain target coordinates. A position represented by the target coordinates is determined as the initial display position of the virtual object in the virtual space. Absence of the adjacent pose information may indicate that currently received first pose information is the first received first pose information after the head-mounted display device is connected to the target device. In this case, it may be considered that the virtual object has not generated a motion trail in the virtual space.

Calculation is performed on the first rotation quaternion included in the first pose information to obtain a rotation angle of the target device and rotation components of the target device in directions of the three coordinate axes in the fixed reference coordinate system. The rotation angle and the rotation components in the directions of the three coordinate axes in the fixed reference coordinate system are mapped to the coordinate system of the virtual space, so as to determine a pose of the virtual object in the virtual space.

Step 2: Display the virtual object at the initial display position in the virtual space.

Step 303: Perform trail smoothing on the adjacent pose information and the first pose information by using the target second pose information set to obtain a smooth pose information sequence, and update the second pose information queue according to the smooth pose information sequence.

In some embodiments, the execution body may use the target second pose information set to perform trail smoothing on the adjacent pose information and the first pose information to obtain the smooth pose information sequence, and update the second pose information queue according to the smooth pose information sequence, where the smooth pose information in the smooth pose information sequence may include a smooth rotation quaternion and smooth coordinates. Trail smoothing may be performed via a trail fusion algorithm. The trail fusion algorithm may include, but is not limited to: a Kalman filter method, a multi-Bayesian estimation method, a Dempster-Shafer (D-S) evidence inference method, etc. The smooth pose information sequence may be used to replace all of the target second pose information in the second pose information queue, so as to realize the update of the second pose information queue.

In some optional implementations of some embodiments, that the execution body updates the second pose information queue according to the smooth pose information sequence may include the following step:

adding each piece of smooth pose information in the smooth pose information sequence into the second pose information queue as the second pose information.

Step 304: Perform mapping on each piece of smooth pose information in the smooth pose information sequence to obtain a target pose information sequence of the virtual object, corresponding to the target device, in the virtual space.

In some embodiments, the execution body may map smooth coordinates included in each piece of smooth pose information in the smooth pose information sequence to the coordinate system of the virtual space to obtain the target coordinates. Calculation is performed on the smooth rotation quaternion included in the smooth pose information to obtain a rotation angle of the target device and rotation components of the target device in the directions of the three coordinate axes in the fixed reference coordinate system. The rotation angle and the rotation components in the directions of the three coordinate axes in the fixed reference coordinate system are mapped to the coordinate system of the virtual space, so as to obtain the pose information of the target device in the virtual space. Then, the target coordinates and the pose information may be determined as target pose information.

Step 305: Update a motion trail of the virtual object in the virtual space based on the target pose information sequence.

In some embodiments, the execution body may sequentially update the position and the pose of the virtual object in the virtual space according to the target pose information in the target pose information sequence, so as to update the motion trail of the virtual object in the virtual space.

In some optional implementations of some embodiments, that the execution body updates the motion trail of the virtual object in the virtual space based on the target pose information sequence may include the following steps:

Step 1: Acquire the pose information of the head-mounted display device, where the pose information may be acquired from the IMU installed in the head-mounted display device. The pose information may include a rotation angle of the head-mounted display device and rotation components of the head-mounted display device in the directions of the x-axis, y-axis, and z-axis in the fixed reference coordinate system.

Step 2: Update the motion trail of the virtual object in the virtual space based on the target pose information sequence and the pose information.

Firstly, the pose information may be mapped to the coordinate system of the virtual space to obtain mapped pose information. Then, the rotation angle and the rotation components included in each piece of target pose information in the target pose information sequence are respectively added with the rotation angle and the rotation components included in the pose information to obtain a final target pose information sequence. The final target pose information sequence is used to update the motion trail of the virtual object in the virtual space.

Thus, it is possible to consider impact of the pose of the head-mounted display device on the presented motion trail while updating the motion trail of the virtual object in the virtual space. Therefore, the updated motion trail is more consistent with the subjective feeling of a user wearing the head-mounted display device, and the interaction experience is improved.

The above-mentioned embodiments of the present disclosure have the following beneficial effects: Through the motion trail update method according to some embodiments of the present disclosure, under the premise of not increasing power consumption of the device, positioning precision and motion trail update precision are improved, and interaction experience of the head-mounted display device is optimized. Specifically, reasons for low related positioning precision and motion trail update precision are that a device with a 3 DOF acquisition function cannot acquire spatial absolute coordinate information, is low in positioning precision, is difficult to fuse with a display scene, and cannot be used in an AR scene, and a device with a 6 DOF acquisition function is high in power consumption, is susceptible to adverse effects of environmental factors, and cannot be applied to portable head-mounted display devices. Based on this, in the motion trail update method according to some embodiments of the present disclosure, firstly, the first pose information for the target device transmitted by the first sensor at the first frequency is received, where the first sensor is disposed in the head-mounted display device. The first pose information transmitted by the first sensor may include spatial absolute coordinate information. Thus, fusion of the target device and a real scene can be realized by using the first pose information, which facilitates use in the AR scene. Then, in response to determining that the adjacent pose information exists and that the first pose information and the second pose information at the tail of the second pose information queue meet the separation inspection condition, the second pose information meeting the preset condition is selected from the second pose information queue as the target second pose information to obtain the target second pose information set, where the adjacent pose information is first pose information which is previously received and is adjacent to the first pose information. Thus, second pose information between the first pose information that is continuously received twice can be determined as the target second pose information, which facilitates subsequent use of the second pose information in the second pose information set to perform trail smoothing on the first pose information. Then, trail smoothing is performed on the adjacent pose information and the first pose information by using the target second pose information set to obtain the smooth pose information sequence, and the second pose information queue is updated according to the smooth pose information sequence. Thus, the first pose information and the target second pose information can be combined to obtain a relatively accurate positioning result and a relatively accurate trail update result. Then, mapping is performed on each piece of smooth pose information in the smooth pose information sequence to obtain the target pose information sequence of the virtual object, corresponding to the target device, in the virtual space, where the virtual space is displayed in the display screen of the head-mounted display device. Thus, the position and pose of the virtual object, corresponding to the target device, in the virtual space can be determined. Finally, the motion trail of the virtual object is updated in the virtual space based on the target pose information sequence. Therefore, under the premise of not increasing power consumption of the device, according to the first pose information and the second pose information, the positioning precision and the motion trail update precision are improved, and the interaction experience of the head-mounted display device is optimized.

Figure 5:
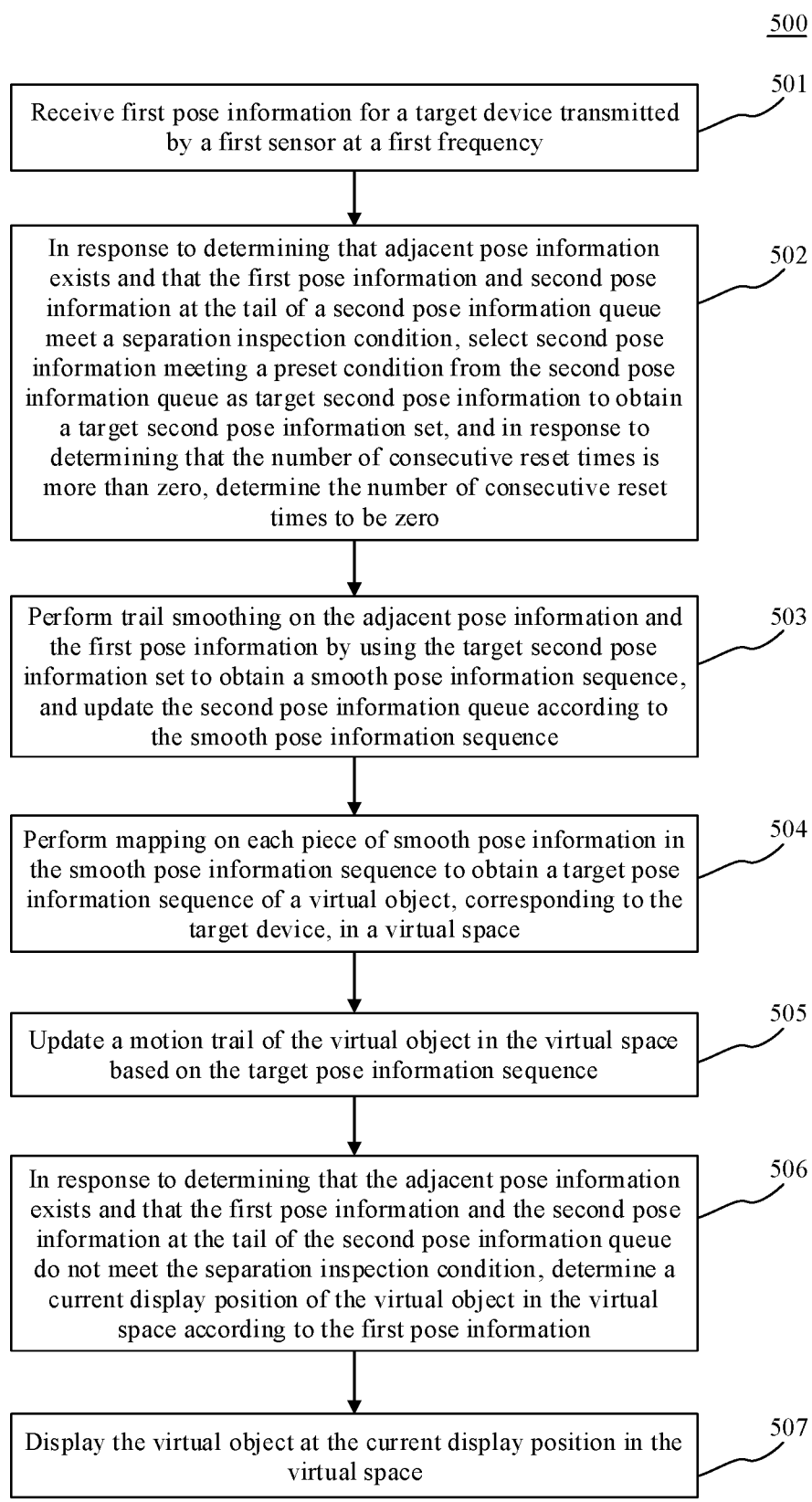
FIG. 5 is a flowchart of a motion trail update method according to some other embodiments of the present disclosure.

Further referring to FIG. 5, a flow 500 of a motion trail update method according to some other embodiments of the present disclosure is shown, which may be applied to a head-mounted display device having a display screen. The flow 500 of the motion trail update method includes the following steps:

Step 501: Receive first pose information for a target device transmitted by a first sensor at a first frequency.

In some embodiments, for the specific implementation and resulting technical effects of step 501, refer to step 301 in those embodiments corresponding to FIG. 3, which are not repeated here.

Step 502: In response to determining that adjacent pose information exists and that the first pose information and second pose information at the tail of a second pose information queue meet a separation inspection condition, select second pose information meeting a preset condition from the second pose information queue as target second pose information to obtain a target second pose information set, and in response to determining that the number of consecutive reset times is greater than zero, determine the number of consecutive reset times to be zero.

In some embodiments, in response to determining that the adjacent pose information exists and that the first pose information and the second pose information at the tail of the second pose information queue meet the separation inspection condition, an execution body (e.g., the head-mounted display device 201 shown in FIG. 2) of the motion trail update method may select the second pose information meeting the preset condition from the second pose information queue as the target second pose information to obtain the target second pose information set, and in response to determining that the number of consecutive reset times is greater than zero, determine the number of consecutive reset times to be zero, where the number of consecutive reset times may be set when the target device is connected to the head-mounted display device. An initial value of the number of consecutive reset times may be zero. The number of consecutive reset times may represent the number of times of continuous separation of the pose of the target device represented by the first pose information and the pose of the target device represented by the second pose information. Thus, whether a deviation between data sent by a first sensor and data sent by a second sensor is serious can be determined according to the number of consecutive reset times, and corresponding measures can be taken conveniently.

In some embodiments, for the specific implementation and resulting technical effects of the step of in response to determining that the adjacent pose information exists and the first pose information and the second pose information at the tail of the second pose information queue meet the separation inspection condition, selecting the second pose information meeting the preset condition from the second pose information queue as the target second pose information to obtain the target second pose information set, refer to step 302 in those embodiments corresponding to FIG. 3, which are not repeated herein.

Step 503: Perform trail smoothing on the adjacent pose information and the first pose information by using the target second pose information set to obtain a smooth pose information sequence, and update the second pose information queue according to the smooth pose information sequence.

Step 504: Perform mapping on each piece of smooth pose information in the smooth pose information sequence to obtain a target pose information sequence of a virtual object, corresponding to the target device, in a virtual space.

Step 505: Update the motion trail of the virtual object in the virtual space based on the target pose information sequence.

In some embodiments, for the specific implementation and resulting technical effects of steps 503-505, refer to steps 303-305 in those embodiments corresponding to FIG. 3, which are not repeated here.

Step 506: In response to determining that the adjacent pose information does not exist and the first pose information and the second pose information at the tail of the second pose information queue do not meet the separation inspection condition, determine a current display position of the virtual object in the virtual space according to the first pose information.

In some embodiments, in response to determining that the adjacent pose information does not exist and that the first pose information and the second pose information at the tail of the second pose information queue do not meet the separation inspection condition, the execution body may determine the current display position of the virtual object in the virtual space according to the first pose information.

The first pose information and the second pose information at the tail of the second pose information queue do not meet the separation inspection condition, which may indicate that the data deviation between the pose of the target device represented by the first pose information and the pose of the target device represented by the second pose information at the tail of the second pose information queue is large, and a separation phenomenon occurs. In this case, the current display position of the virtual object in the virtual space can be determined based on the first pose information.

In some optional implementations of some embodiments, the current display position of the virtual object in the virtual space is determined according to the first pose information. The following steps may be further included:

Step 1: Increase the number of consecutive reset times by one.

Step 2: In response to determining that the number of consecutive reset times is greater than or equal to a preset number of times, suspend updating the motion trail of the virtual object in the virtual space within a preset time period, where the preset number of times is adjusted according to actual applications, which is not limited.

Step 507: Display the virtual object at the current display position in the virtual space.

In some embodiments, the execution body may display the virtual object at the current display position in the virtual space.

In some optional implementations of some embodiments, the execution body may further empty the second pose information queue. Thus, historical data stored in the second pose information queue can be emptied.

It can be seen in FIG. 5 that, compared with the description of some embodiments corresponding to FIG. 3, the flow 500 of the motion trail update method of some embodiments corresponding to FIG. 5 embodies the steps of processing in the case that the deviation between the data transmitted by the first sensor and the data transmitted by the second sensor is large. Thus, the situation that the deviation between the finally updated trail and the actual motion trail of the target device is large can be avoided, and the interaction experience can be further improved.

Figure 6:
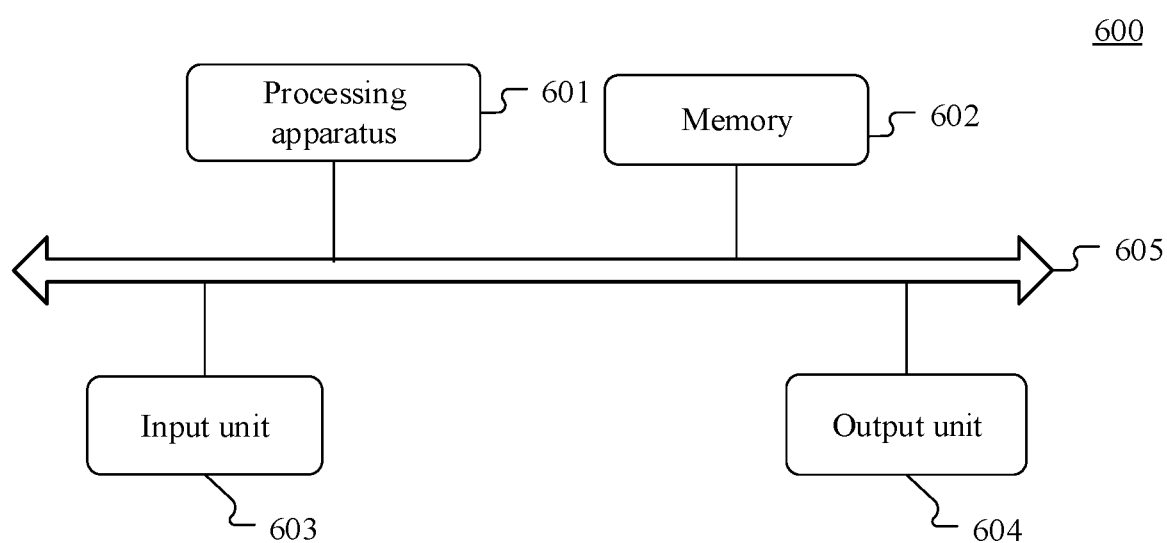
FIG. 6 is a schematic structural diagram of a head-mounted display device suitable for implementing some embodiments of the present disclosure.

Further referring to FIG. 6, a schematic structural diagram of a head-mounted display device 600 suitable for implementing some embodiments of the present disclosure is shown. The head-mounted display device shown in FIG. 6 is merely one example and should not impose any limitation on the functions and scope of use of embodiments of the present disclosure.

As shown in FIG. 6, the head-mounted display device 600 may include a processing apparatus (e.g., a central processing unit or a graphics processing unit) 601, a memory 602, an input unit 603, and an output unit 604, where the processing apparatus 601, the memory 602, the input unit 603 and the output unit 604 are connected to each other via a bus 605. The processing apparatus 601 in the head-mounted display device specifically implements a motion trail update function defined in the method of the present disclosure by invoking a computer program stored in the memory 602. In some implementations, the input unit 603 may include a sensor signal receiving device. Thus, second pose information sent by a second sensor at a second frequency can be received by the sensor signal receiving device in the input unit 603. The output unit 604 may include a display screen for the updated motion trail.

Although FIG. 6 illustrates the head-mounted display device 600 having various apparatuses, it should be understood that not all illustrated apparatuses are required to be implemented or provided. More or fewer apparatuses may alternatively be implemented or provided. Each block shown in FIG. 6 may represent one apparatus or may represent a plurality of apparatuses as desired.

In particular, according to some embodiments of the present disclosure, the process described above with reference to the flowchart may be implemented as a computer software program and stored in the memory 602. For example, some embodiments of the present disclosure include a computer program product including a computer program carried on a computer-readable medium, the computer program containing program code for performing the method shown in the flowchart. When the computer program is executed by the processing apparatus 601, the functions defined in the method of some embodiments of the present disclosure are performed.

It should be noted that the computer-readable medium recited in some embodiments of the present disclosure may be a computer-readable signal medium or a computer-readable storage medium or any combination of the two. The computer-readable storage medium may be, for example, but not limited to, an electronic, magnetic, optical, electromagnetic, infrared, or semiconductor system, apparatus, or device, or any combination thereof. More specific examples of the computer-readable storage medium may include, but is not limited to: an electrical connection having one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. In some embodiments of the present disclosure, the computer-readable storage medium may be any tangible medium that contains, or stores a program that can be used by or in conjunction with an instruction execution system, apparatus, or device. In some embodiments of the present disclosure, the computer-readable signal medium may include a data signal, carrying computer-readable program code therein, propagated in baseband or as part of a carrier wave. Such propagated data signal may take many forms, including, but not limited to, an electromagnetic signal, an optical signal, or any suitable combination thereof. The computer-readable signal medium may also be any computer-readable medium other than the computer-readable storage medium that can transmit, propagate, or transport a program that can be used by or in connection with an instruction execution system, apparatus, or device. The program code contained on the computer-readable medium may be transmitted using any appropriate medium, including but not limited to a wire, an optical cable, radio frequency (RF), etc., or any suitable combination thereof.

In some implementations, a client and a server may use any currently known or future developed network protocol, such as a hypertext transfer protocol (HTTP) to communicate, and may be interconnected with any form or medium of digital data (e.g., a communication network). Examples of the communication network include a local area network (LAN), a wide area network (WAN), an inter-network (e.g., the Internet), and a peer-to-peer network (e.g., an ad hoc peer-to-peer network), as well as any currently known or future developed network.

The computer-readable medium may be included in the head-mounted display device, or may exist alone without being assembled into the head-mounted display device. The computer-readable medium carries one or more programs that, when executed by the head-mounted display device, cause the head-mounted display device to: receive first pose information for a target device transmitted by a first sensor at a first frequency, where the first sensor is disposed in the head-mounted display device; in response to determining that adjacent pose information exists and that the first pose information and second pose information at the tail of a second pose information queue meet a separation inspection condition, select second pose information meeting a preset condition from the second pose information queue as target second pose information to obtain a target second pose information set, where the adjacent pose information is first pose information which is previously received and is adjacent to the first pose information; perform trail smoothing on the adjacent pose information and the first pose information by using the target second pose information set to obtain a smooth pose information sequence, and update the second pose information queue according to the smooth pose information sequence; perform mapping on each piece of smooth pose information in the smooth pose information sequence to obtain a target pose information sequence of a virtual object, corresponding to the target device, in a virtual space, where the virtual space is displayed in a display screen of the head-mounted display device; and update the motion trail of the virtual object in the virtual space based on the target pose information sequence.

The computer program code for performing operations of some embodiments of the present disclosure may be written in one or more programming languages or combinations thereof, including an object oriented programming language such as Java, Smalltalk, C++ and conventional procedural programming languages, such as the "C" programming language or similar programming languages. The program code may be executed entirely on a user computer, partly on a user computer, as a stand-alone software package, partly on a user computer and partly on a remote computer, or entirely on a remote computer or server. In the case involving the remote computer, the remote computer may be connected to the user computer through any type of network, including a local area network (LAN) or a wide area network (WAN), or connected to an external computer (for example, via the Internet using an Internet service provider).

The flowcharts and block diagrams in the figures illustrate the architecture, functionality, and operation of possible implementations of systems, methods, and computer program products according to various embodiments of the present disclosure. In this regard, each block in the flowcharts or block diagrams may represent a module, program segment, or portion of a code, which includes one or more executable instructions for implementing a specified logical function. It should also be noted that, in some alternative implementations, the functions noted in the blocks may also occur out of the order noted in the figures. For example, two blocks shown in succession may, in fact, be executed substantially concurrently, or may sometimes be executed in the reverse order, depending upon the functions involved. It should also be noted that each block of the block diagrams and/or flowcharts, and combinations of blocks in the block diagrams and/or flowcharts, may be implemented by special purpose hardware-based systems that perform a specified functions or operation or combinations of special purpose hardware and computer instructions.

The functions described above herein may be performed, at least in part, by one or more hardware logic components. For example, without limitation, exemplary types of hardware logic components that can be used include field-programmable gate arrays (FPGA), application-specific integrated circuits (ASIC), application-specific standard products (ASSP), system-on-chip systems (SOC), complex programmable logic devices (CPLD), and the like.

What is claimed:

1. A motion trail update method, applied to a head-mounted display device having a display screen, comprising:
   receiving first pose information for a target device transmitted by a first sensor at a first frequency, wherein the first sensor is disposed in the head-mounted display device;
   in response to determining that adjacent pose information exists and that the first pose information and second pose information at a tail of a second pose information queue meet a separation inspection condition, selecting second pose information meeting a preset condition from the second pose information queue as target second pose information to obtain a target second pose information set, wherein the adjacent pose information is previously received first pose information that is adjacent to the first pose information, wherein the separation inspection condition is that a pose deviation between the first pose information and the second pose information is smaller than or equal to a preset degree and a displacement deviation therebetween is smaller than or equal to a preset displacement length, and the preset condition is that a receiving time of the second pose information is between a time point of receiving the adjacent pose information and a time point of receiving the first pose information;
   performing trail smoothing on the adjacent pose information and the first pose information by using the target second pose information set to obtain a smooth pose information sequence, and updating the second pose information queue according to the smooth pose information sequence;
   performing mapping on each piece of smooth pose information in the smooth pose information sequence to obtain a target pose information sequence of a virtual object, corresponding to the target device, in a virtual space, wherein the virtual space is displayed in the display screen of the head-mounted display device; and
   updating a motion trail of the virtual object in the virtual space based on the target pose information sequence.

2. The method according to claim 1, wherein the second pose information in the second pose information queue is generated by the following steps:
   receiving relative pose information for the target device transmitted by a second sensor at a second frequency, wherein the second sensor is disposed in the target device, and the second frequency is higher than the first frequency;
   in response to determining that the adjacent pose information exists and that the second pose information queue is empty, generating the second pose information according to the adjacent pose information and the relative pose information; or
   in response to determining that the adjacent pose information exists and that the second pose information queue is not empty, generating the second pose information according to the second pose information at the tail of the second pose information queue and the relative pose information; and
   adding the generated second pose information into the second pose information queue.

3. The method according to claim 1, wherein the updating the motion trail of the virtual object in the virtual space based on the target pose information sequence comprises:
   acquiring pose information of the head-mounted display device; and
   updating the motion trail of the virtual object in the virtual space based on the target pose information sequence and the acquired pose information of the head-mounted display device.

4. The method according to claim 1, wherein the updating the second pose information queue according to the smooth pose information sequence comprises:
   adding each piece of smooth pose information in the smooth pose information sequence into the second pose information queue as second pose information.

5. The method according to claim 1, further comprising:
   in response to determining that the adjacent pose information does not exist, determining an initial display position of the virtual object in the virtual space according to the first pose information; and
   displaying the virtual object at the initial display position in the virtual space.

6. The method according to claim 1, further comprising:
   in response to determining that the adjacent pose information exists and that the first pose information and the second pose information at the tail of the second pose information queue do not meet the separation inspection condition, determining a current display position of the virtual object in the virtual space according to the first pose information; and
   displaying the virtual object at the current display position in the virtual space.

7. The method according to claim 6, further comprising:
   emptying the second pose information queue.

8. The method according to claim 6, wherein the selecting second pose information meeting the preset condition from the second pose information queue as the target second pose information to obtain the target second pose information set further comprises:

in response to determining that a number of consecutive reset times is greater than zero, determining the number of consecutive reset times to be zero.

9. The method according to claim 8, wherein the determining the current display position of the virtual object in the virtual space according to the first pose information further comprises:

increasing the number of consecutive reset times by one; and in response to determining that the number of consecutive reset times is greater than or equal to a preset number of times, suspending updating the motion trail of the virtual object in the virtual space within a preset time period.

\* \* \* \* \*